No. 736,027. PATENTED AUG. 11, 1903.
F. SAUER.
PRINT MOUNTING DEVICE.
APPLICATION FILED NOV. 7, 1902.
NO MODEL.
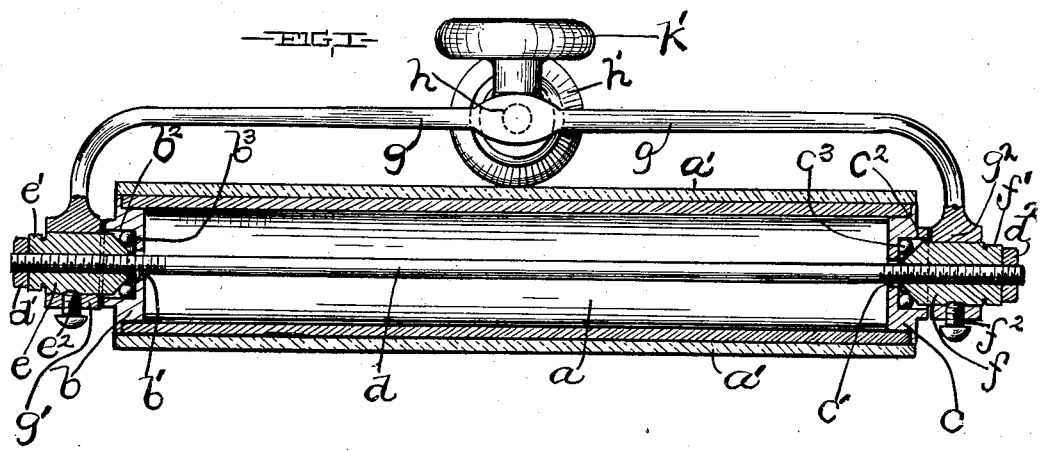
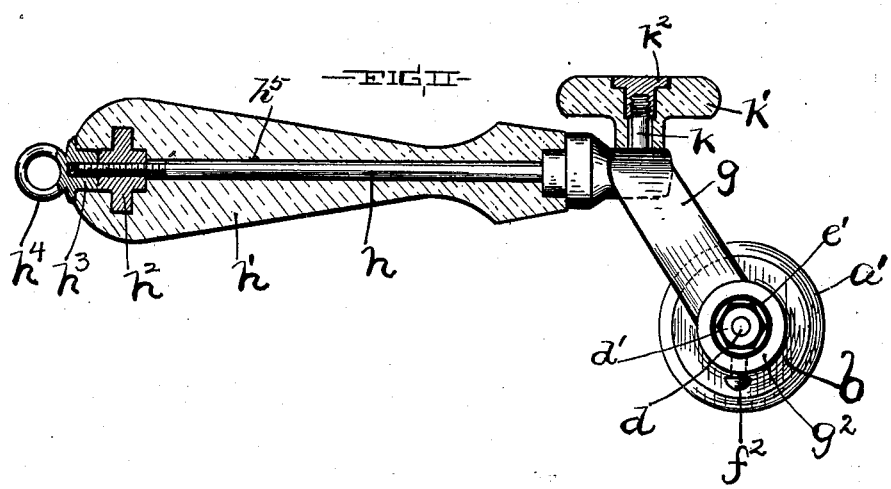
WITNESSES:
Daniel E Daly.
Victor C. Lynch
INVENTOR
Frank Sauer
BY
Lynch & Dorer
his ATTORNEYS.

No. 736,027. Patented August 11, 1903.

UNITED STATES PATENT OFFICE.

FRANK SAUER, OF CLEVELAND, OHIO.

PRINT-MOUNTING DEVICE.

SPECIFICATION forming part of Letters Patent No. 736,027, dated August 11, 1903.

Application filed November 7, 1902. Serial No. 130,454. (No model.)

*To all whom it may concern:*

Be it known that I, FRANK SAUER, a citizen of the United States of America, residing at Cleveland, in the county of Cuyahoga and State of Ohio, have invented certain new and useful Improvements in Print-Mounting Devices; and I hereby declare the following to be a full, clear, and exact description of the invention, such as will enable others skilled in the art to which it pertains to make and use the same.

This invention relates to a device for smoothing or pressing a sheet of paper or other material after it has been pasted upon a cardboard or other surface.

The object of this invention is to provide a device for mounting prints of photographs which can be easily assembled and which has the roller portion so mounted and supported that it will have very little friction in its bearings.

My invention therefore consists in certain features of construction and combination of parts, as illustrated in the drawings and hereinafter described in the specification and pointed out in the claims.

In the accompanying drawings, Figure I is a view, mostly in section, illustrating my device. Fig. II is an end view, mostly in section, illustrating same.

Again referring to the drawings, $a$ represents the roller of my device and consists, preferably, of a hollow metallic cylinder or tube of any desired length. The exterior of the tube $a$ is preferably covered with a coating $a'$ of rubber or similar material. In the ends of the tube $a$ are rigidly secured heads or end pieces $b$ and $c$, respectively. In the end piece $b$ is formed a bore $b'$, around which, in the exterior surface of the said piece $b$, is formed an annular depression or seat $b^2$. Likewise in the end piece $c$ is formed a bore $c'$, around which, in the exterior surface of the said end piece $c$, is formed an annular depression or seat $c^2$. The seats $b^2$ and $c^2$ form cups for holding ball-bearings $b^3$ and $c^3$, respectively. A shaft $d$ extends longitudinally through the roller $b$ and forms the axle thereof. The ends of the shaft $d$ project beyond the ends of the roller $a$ and are screw-threaded. On the respective ends of the shaft $d$ are mounted bearing-cones $e$ and $f$, respectively. The bearing-cones $e$ and $f$ are provided with internal screw-threads corresponding to the screw-threads on the ends of the shaft $d$. Milled rings $e'$ and $f'$ are formed integral with the cones, by means of which the cones can be very accurately adjusted when the device is assembled. On the ends of the shaft $d$ are arranged nuts $d'$ and $d^2$, which serve to lock the cones in position after they have been adjusted.

A yoke $g$ is arranged to span the roller $a$, and on the respective ends thereof are formed straps or rings $g'$ and $g^2$, which encircle the bearing-cones $e$ and $f$. Screws $e^2$ and $f^2$ are passed through the respective straps $g'$ and $g^2$ and engage the cones $e$ and $f$. In the center of the yoke is rigidly secured one end of a rod $h$, the other end of which is screw-threaded. This rod is mounted so that when the device is in its operative position the said rod will extend out horizontally from the said yoke $g$. The handle $h'$ is preferably formed of wood and is provided with a central longitudinal bore $h^5$. In the handle $h'$ is rigidly secured a nut $h^2$, which is provided with a screw-thread corresponding to the thread on the end of the rod $h$. On the end of the rod $h$ is arranged a lock-nut $h^3$, which prevents the handle $h'$ from turning and becoming loose on the rod $h$. A ring $h^4$ is preferably formed integral with the lock-nut $h^3$ and serves as a means for suspending the device when it is not in use. A small stud $k$ extends vertically from the center of the yoke $g$. On this stud is mounted a knob $k'$, which is held in place thereon by means of a nut $k^2$, which engages a screw-thread formed on the end of the stud $k$.

What I claim is—

1. A print-mounting device comprising a tube, an end piece secured at each end of the said tube and provided with a central opening, a seat arranged in the exterior surface of each end piece around the said opening therein, ball-bearings arranged in the said seats, a shaft of less diameter than the openings in the said end pieces extending longitudinally through the said tube and projecting at each end thereof, screw-threads formed on the respective ends of the said shaft, a bearing-cone adjustably mounted on each end of said shaft and arranged to bear on the said ball-bearings, means for locking the bearing-cones on the said shaft, and a handle rigidly secured to the said bearing-cones, substantially as described and for the purpose set forth.

2. A print-mounting device comprising a tube, end pieces arranged in said tube, a shaft mounted in said tube, bearing-cones secured on the respective ends of the said shaft, ball-bearings arranged between the respective end pieces and the respective bearing-cones, a yoke spanning the said roller and secured to the said bearing-cones and two handles secured to the said yoke and extending therefrom at right angles to each other, substantially as described and for the purpose set forth.

In testimony whereof I sign the foregoing specification, in the presence of two witnesses, this 1st day of November, 1902.

FRANK SAUER.

Witnesses:
VICTOR C. LYNCH,
G. M. HAYES.